(12) United States Patent
Li et al.

(10) Patent No.: US 11,989,840 B2
(45) Date of Patent: May 21, 2024

(54) AUGMENTED REALITY EFFECTS ON BLOCKCHAIN

(71) Applicant: Lemon Inc., Grand Cayman (KY)

(72) Inventors: Peilin Li, Los Angeles, CA (US);
Runjia Tian, Los Angeles, CA (US);
Chongxin Luo, Culver City, CA (US);
Daniel Sanchez, Culver City, CA (US);
Yilu Fan, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 86 days.

(21) Appl. No.: 17/741,135

(22) Filed: May 10, 2022

(65) Prior Publication Data

US 2023/0368473 A1 Nov. 16, 2023

(51) Int. Cl.
*G06T 19/00* (2011.01)
*G06F 16/955* (2019.01)
(Continued)

(52) U.S. Cl.
CPC .......... *G06T 19/006* (2013.01); *G06F 16/955* (2019.01); *G06Q 20/36* (2013.01); *G06T 11/00* (2013.01); *H04L 9/50* (2022.05)

(58) Field of Classification Search
CPC ..... G06T 19/006; G06T 11/00; G06F 16/955; G06Q 20/36; H04L 9/50
See application file for complete search history.

(56) References Cited

U.S. PATENT DOCUMENTS

2019/0129715 A1 5/2019 Ding et al.
2019/0158289 A1* 5/2019 Drouin ................. H04L 9/3239
(Continued)

FOREIGN PATENT DOCUMENTS

CN 111833461 A 10/2020

OTHER PUBLICATIONS

D. Chirtoaca, J. Ellul and G. Azzopardi, "A Framework for Creating Deployable Smart Contracts for Non-fungible Tokens on the Ethereum Blockchain," 2020 IEEE International Conference on Decentralized Applications and Infrastructures (DAPPS), Oxford, UK , 2020, pp. 100-105; (Year: 2020).*

(Continued)

*Primary Examiner* — Daniel F Hajnik
(74) *Attorney, Agent, or Firm* — Astute IP Law Group

(57) ABSTRACT

Example implementations include a method, apparatus and computer-readable medium for managing augmented reality (AR) effects on a blockchain, comprising receiving a request to convert an AR effect into a decentralized digital asset. The implementations further include uploading an AR effect package comprising execution files of the AR effect to a decentralized server connected to a peer-to-peer network. The implementations further include generating metadata associated with the AR effect package, wherein the metadata indicates attributes of the AR effect and a storage address of the AR effect package in the decentralized server. The implementations further include generating a token universal resource identifier (tokenURI) linked to the metadata and generating, using a smart contract, the decentralized digital asset corresponding to the AR effect package and the tokenURI for storage on the blockchain and subsequent access by a content creation application.

17 Claims, 5 Drawing Sheets

(51) Int. Cl.
*G06Q 20/36* (2012.01)
*G06T 11/00* (2006.01)
*H04L 9/00* (2022.01)

(56) References Cited

U.S. PATENT DOCUMENTS

| | | | |
|---|---|---|---|
| 2020/0143015 A1 | 5/2020 | LeBeau et al. | |
| 2021/0264444 A1* | 8/2021 | Chen | G06F 21/64 |
| 2022/0392176 A1* | 12/2022 | Malik | H04L 63/12 |
| 2023/0098615 A1* | 3/2023 | Advani | H04L 9/3213 |
| | | | 713/193 |
| 2023/0245398 A1 | 8/2023 | Zhang et al. | |

OTHER PUBLICATIONS

International Search Report in PCT/SG2023/050296, dated Oct. 18, 2023, 4 pages.

Lee, Martin, "Everything you need to know about NFTs [2023]," Nansen, Feb. 1, 2023, Retrieved from the Internet: <URL: https://www.nansen.ai/guides/everything-you-need-to-know-about-nfts>, 20 pages.

* cited by examiner

AUGMENTED REALITY EFFECTS ON BLOCKCHAIN

TECHNICAL FIELD

The described aspects relate to distributed ledger systems.

BACKGROUND

Aspects of the present disclosure relate generally to distributed ledger systems, and more particularly, to managing augmented reality (AR) effects on a blockchain.

Digital assets, such as tokens that are non-interchangeable, include two dimensional (2D) images or three dimensional (3D) models. However, such digital assets have limited use cases. Thus, there is a need for improvement in mechanisms for creating and using such digital assets.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method for managing augmented reality (AR) effects on a blockchain, comprising receiving a request to convert an AR effect into a decentralized digital asset. The method further includes uploading an AR effect package comprising execution files of the AR effect to a decentralized server connected to a peer-to-peer network. The method further includes generating metadata associated with the AR effect package, wherein the metadata indicates attributes of the AR effect and a storage address of the AR effect package in the decentralized server. Additionally, the method further includes generating a token universal resource identifier (tokenURI) linked to the metadata. Additionally, the method further includes generating, using a smart contract, the decentralized digital asset corresponding to the AR effect package and the tokenURI, wherein the smart contract assigns ownership of the decentralized digital asset to a creator of the AR effect package. Additionally, the method further includes storing, on the blockchain, a creation event including generation information of the decentralized digital asset. Additionally, the method further includes receiving a user request from a content creation application to access the AR effect package, wherein the user request comprises the tokenURI. Additionally, the method further includes enabling, using the smart contract, the access to the AR effect package by the content creation application.

Another example aspect includes an apparatus for managing augmented reality (AR) effects on a blockchain, comprising a memory and a processor communicatively coupled with the memory. The processor is configured to receive a request to convert an AR effect into a decentralized digital asset. The processor is configured to upload an AR effect package comprising execution files of the AR effect to a decentralized server connected to a peer-to-peer network. The processor is further configured to generate metadata associated with the AR effect package, wherein the metadata indicates attributes of the AR effect and a storage address of the AR effect package in the decentralized server. Additionally, the processor further configured to generate a token universal resource identifier (tokenURI) linked to the metadata. Additionally, the processor further configured to generate, using a smart contract, the decentralized digital asset corresponding to the AR effect package and the tokenURI, wherein the smart contract assigns ownership of the decentralized digital asset to a creator of the AR effect package. Additionally, the processor further configured to store, on the blockchain, a creation event including generation information of the decentralized digital asset. Additionally, the processor further configured to receive a user request from a content creation application to access the AR effect package, wherein the user request comprises the tokenURI. Additionally, the processor further configured to enable, using the smart contract, the access to the AR effect package by the content creation application.

Another example aspect includes an apparatus for managing augmented reality (AR) effects on a blockchain, comprising means for receiving a request to convert an AR effect into a decentralized digital asset. The apparatus further includes means for uploading an AR effect package comprising execution files of the AR effect to a decentralized server connected to a peer-to-peer network. The apparatus further includes means for generating metadata associated with the AR effect package, wherein the metadata indicates attributes of the AR effect and a storage address of the AR effect package in the decentralized server. Additionally, the apparatus further includes means for generating a token universal resource identifier (tokenURI) linked to the metadata. Additionally, the apparatus further includes means for generating, using a smart contract, the decentralized digital asset corresponding to the AR effect package and the tokenURI, wherein the smart contract assigns ownership of the decentralized digital asset to a creator of the AR effect package. Additionally, the apparatus further includes means for storing, on the blockchain, a creation event including generation information of the decentralized digital asset. Additionally, the apparatus further includes means for receiving a user request from a content creation application to access the AR effect package, wherein the user request comprises the tokenURI. Additionally, the apparatus further includes means for enabling, using the smart contract, the access to the AR effect package by the content creation application.

Another example aspect includes a computer-readable medium having instructions stored thereon for managing augmented reality (AR) effects on a blockchain, wherein the instructions are executable by a processor to receive a request to convert an AR effect into a decentralized digital asset. The instructions are further executable to upload an AR effect package comprising execution files of the AR effect to a decentralized server connected to a peer-to-peer network. The instructions are further executable to generate metadata associated with the AR effect package, wherein the metadata indicates attributes of the AR effect and a storage address of the AR effect package in the decentralized server. Additionally, the instructions are further executable to generate a token universal resource identifier (tokenURI) linked to the metadata. Additionally, the instructions are further executable to generate, using a smart contract, the decentralized digital asset corresponding to the AR effect package and the tokenURI, wherein the smart contract assigns ownership of the decentralized digital asset to a creator of the AR effect package. Additionally, the instructions are further executable to store, on the blockchain, a creation event including generation information of the decentralized digital asset. Additionally, the instructions are further executable to receive a user request from a content creation application to access the AR effect package, wherein the user request comprises the tokenURI. Additionally, the instructions are further executable to enable, using the smart contract, the access to the AR effect package by the content creation application.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The present disclosure provides a way to combine tokens that are non-interchangeable (used interchangeably with "decentralized digital assets" or "digital assets") with diverse augmented reality (AR) technology. A decentralized digital asset may be a cryptographic token that cannot be replicated and serves as a non-interchangeable unit of data stored on a blockchain. In an exemplary aspect, an AR effect package, such as but not limited to a folder or a zip folder, storing a plurality of characteristics and/or code that define the AR effect, is treated as a decentralized digital asset, and users of computer applications, such as, but not limited to, social media applications with camera-based features can use the digital asset to create videos or images.

More specifically, the AR effect is serialized into a package (also referred to as a sticker package), such as a computer file folder or a compressed version of a computer file folder such as a zip folder. The package is either created in-house by interactive engineers or by external effect creators. The package may then be decoded on mobile applications as effect filters.

Figure 1:
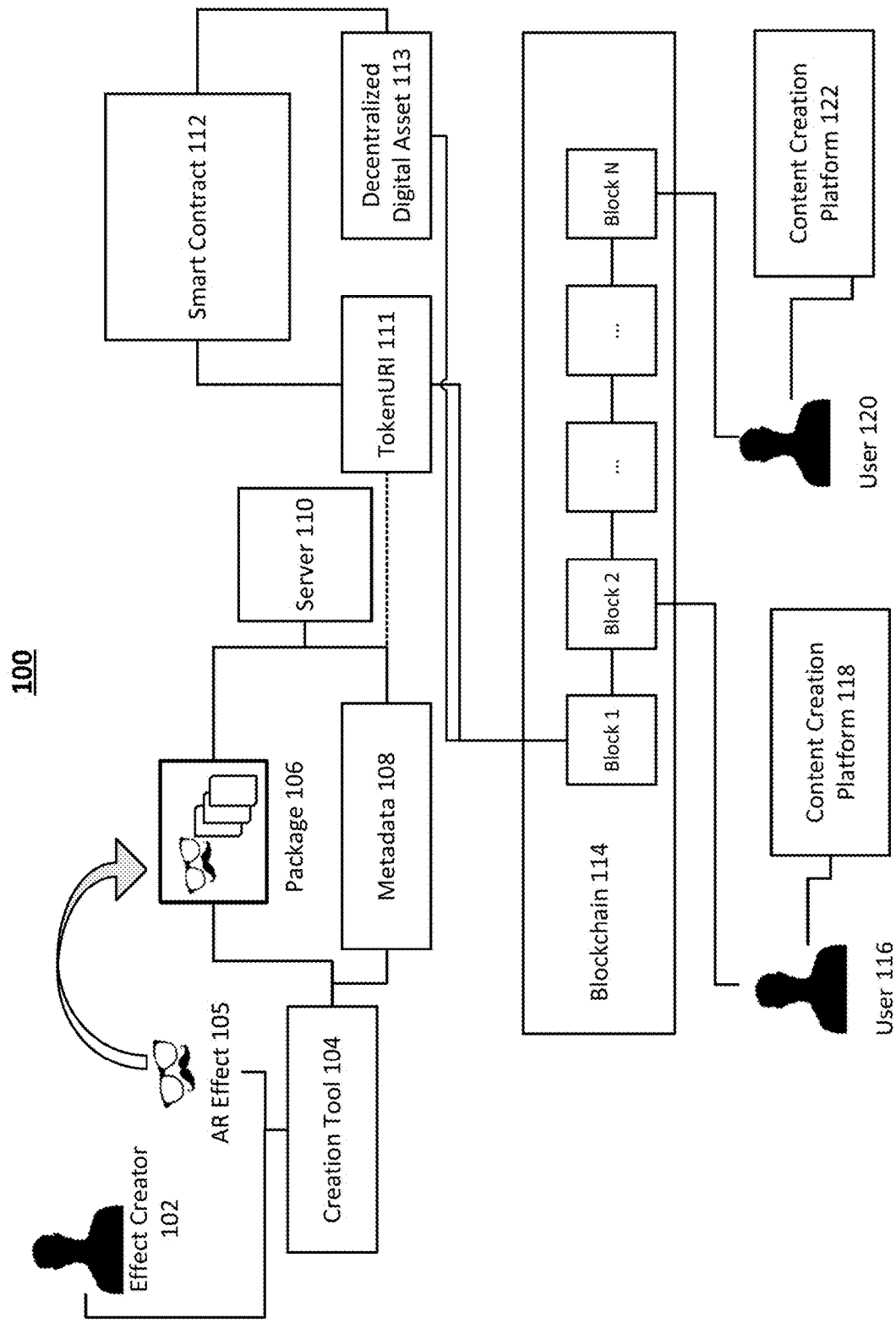
FIG. 1 is a diagram of a system for accessing generated augmented reality (AR) effects using blockchain, in accordance with exemplary aspects of the present disclosure.

FIG. 1 is a diagram of system 100 for accessing generated augmented reality (AR) effects using blockchain, in accordance with exemplary aspects of the present disclosure. System 100 features a pipeline for storing, minting, trading and distributing decentralized digital assets using blockchain.

For example, effect creator 102 may create AR effect 105 on creation tool 104 (e.g., Effect House) that they would like to share with users such as user 116 and user 120. Conventionally, in order to share AR effect 105 on a platform (e.g., a social media application), effect creator 102 must create an account on the platform, and upload AR effect 105 to a central server belonging solely to the platform. If effect creator 102 intends to share the same AR effect on a different platform, effect creator 102 must create an account on the different platform and upload AR effect 105 to another central server belonging solely to the different platform. This causes exclusivity issues, as users of one platform cannot access content on the server of the different platform. This process can also be inefficient and cumbersome for effect creator 102, who may intend to upload AR effect 105 on several platforms, as the effect creator 102 needs to duplicate their effort and/or learn new tools and/or systems in order to create and store the same AR effect on each different platform. Furthermore, the ownership of AR effect 105 may be unprotected, as in some cases another creator can simply copy AR effect 105 or use AR effect 105 as their own without authorization.

In system 100, creation tool 104 may feature a plugin that enables effect creator 102 to upload an AR effect package 106, including a computer folder of normal memory size or of a compressed memory size (e.g., a zip folder), which has all the visuals, scripts and configuration files of AR effect 105, to server 110. For example, the graphical user interface of creation tool 104 may feature an "Upload Effect as Decentralized Digital Asset" button. After the user clicks the upload button, creation tool 104 uploads the package 106 to server 110. In some aspects, a panel may pop up prompting effect creator 102 to create metadata 108 for AR effect 105 and select a thumbnail (e.g., a JPEG image) for the effect. Metadata 108 may include information about AR effect 105 such as, but not limited to, an effect type, which describes a general category of the effect (e.g., face effect, environment effect, world effect, hand effect, body effect etc.), a storage size of AR effect 105, component physics (e.g., how the AR effect interacts with surfaces, lighting, etc.), visual data (e.g., colors, shapes, etc.), and any other information or logic that defines how the effect looks and/or functions. Metadata 108 may also include a storage address of AR effect package 106 on server 110.

Server 110 may be a decentralized server that forms part of a peer-to-peer network. For example, server 110 may utilize a protocol such as the Interplanetary File System (IPFS). In some cases, a centralized server is not recommended because AR effect 105 would be linked using an HTTP address on the centralized server. If the owner of AR effect 105 were to change the object at the HTTP address (e.g., change AR effect 105 with another AR effect), the value of decentralized digital asset 113 generated from AR effect package 106 will change. IPFS uses content addressing and multiple nodes store the uploaded data. Accordingly, when AR effect package 106 is uploaded to server 110 (part of IPFS), a content identifier of package 106 is produced from the data of package 106 and linked to package 106 in the IPFS network. The content identifier solely refers to package 106; thus package 106 cannot be modified without modifying the content identifier. If package 106 is somehow modified, the content identifier will be ineffective (unlike an HTTP address, which will simply point to the different AR effect).

The data storage entity (e.g., IPFS) may further generate a token universal resource (tokenURI) 111, which works as an index that points to metadata 108 that is stored in server 110. For example, accessing the index, such as a link, in tokenURI 111 directs a user to metadata 108.

In order to convert AR effect package 106 into decentralized digital asset 113, smart contract 112 is utilized. Smart contract 112 may be a software program stored on blockchain 114 that runs when certain predetermined conditions are met. Such conditions include receiving a request to generate a digital asset, modify a digital asset, change ownership of a digital asset, delete a digital asset, etc. Smart contract 112 is specifically configured to generate a decentralized digital asset based on the requests/commands made by the effect creator 102, and store event data (e.g., about creation events, ownership transfer events, etc.) on blockchain 114.

Smart contract 112 receives tokenURI 111 and a wallet address of a wallet belonging to effect creator 102, and executes a mint function to generate decentralized digital asset 113 and assign ownership of decentralized digital asset 113 to effect creator 102. In an aspect, the wallet address may be a unique identifier, such as but not limited to a randomly generated set of numbers and/or letters, wherein the wallet address is associated with or linked to an electronic account (e.g., a crypto wallet). For example, the wallet is a software program or a physical device that enables storage of digital assets such as decentralized digital asset 113. It should be noted that a wallet can hold multiple addresses, and during the minting process, smart contract 112 takes an address parameter (e.g., the address of effect creator 102 and linked to decentralized digital asset 113). This address is chosen by the user, and used during the minting process. Depending on the implementation, the address may also be the default address that is provided by the wallet.

The wallet may further include private and public encryption keys, wherein the public key is derived from the private key and may be the wallet address used to exchange digital assets. For example, the wallet address may be a combination of alphanumeric characters unique to effect creator 102.

Information regarding the creation event (e.g., a transaction) of decentralized digital asset 113 is subsequently stored on blockchain 114 by smart contract 112. As ownership of decentralized digital asset 113 changes, additional events are published to blockchain 114. For example, user 116 may obtain tokenURI 111 associated with decentralized digital asset 113 and attempt to acquire ownership of AR effect package 106. For example, user 116 may connect their wallet (e.g., provide a wallet address) to content creation platform 118, which may be a mobile application (e.g., a social media application). This enables platform 118 to find information corresponding to the address in smart contract 112 on blockchain 114 and display decentralized digital assets with AR effects tags.

In general, tokenURI 111 is stored in the storage space(s) of smart contract 112. A user (e.g., user 116) is able to send a decentralized digital asset request transaction to smart contract 112 that includes a public key of user 116 (e.g., an Ethereum address), an identifier of decentralized digital asset 113 (e.g., a hash value of the asset), and a signature (signed by a private key of the user). Smart contract 112 uses the signature to verify the identity of user 116, and returns the corresponding information about the requested decentralized digital asset 113 (e.g., tokenURI 111).

User 116 may then select and download decentralized digital assets to local storage on a computing device (e.g., a smartphone, laptop, desktop, tablet, or digital assistant) through corresponding IPFS storage addresses in metadata. For example, user 116 may use tokenURI 111 to access metadata 108, and subsequently download package 106 from server 110 using the storage address listed in metadata 108.

Content creation platform 118 can then decode the AR effect package 106 through an effect engine and allow user 116 to create videos using AR effect 105. In some aspects, ownership of decentralized digital asset 113 may be transferred from effect creator 102 to user 116, and the ownership change event may be recorded on blockchain 114 (e.g., in block 2).

As mentioned previously, decentralized digital asset 113 is accessible to different content creation platforms. For example, user 120 may also be able to use tokenURI 111 to access metadata 108, and subsequently download package 106 from server 110 using the storage address listed in metadata 108. Content creation platform 122, which may be a different mobile application (e.g., a different social media application) can then decode package 106 and enable its usage by user 120. Furthermore, ownership of decentralized digital asset 113 may be transferred from effect creator 102 to user 120, or from user 116 to user 120. The ownership change event may be recorded on blockchain 114 (e.g., in block N, where N is any whole number).

Because all events are recorded on blockchain 114, system 100 enables an effect creator to protect the AR content he/she creates (e.g., AR effect 105) and cement ownership or ownership transfers. The effect creator can also share AR effect 105 more easily across different platforms, without needing to learn the intricacies of each different platform of interest.

Figure 2:
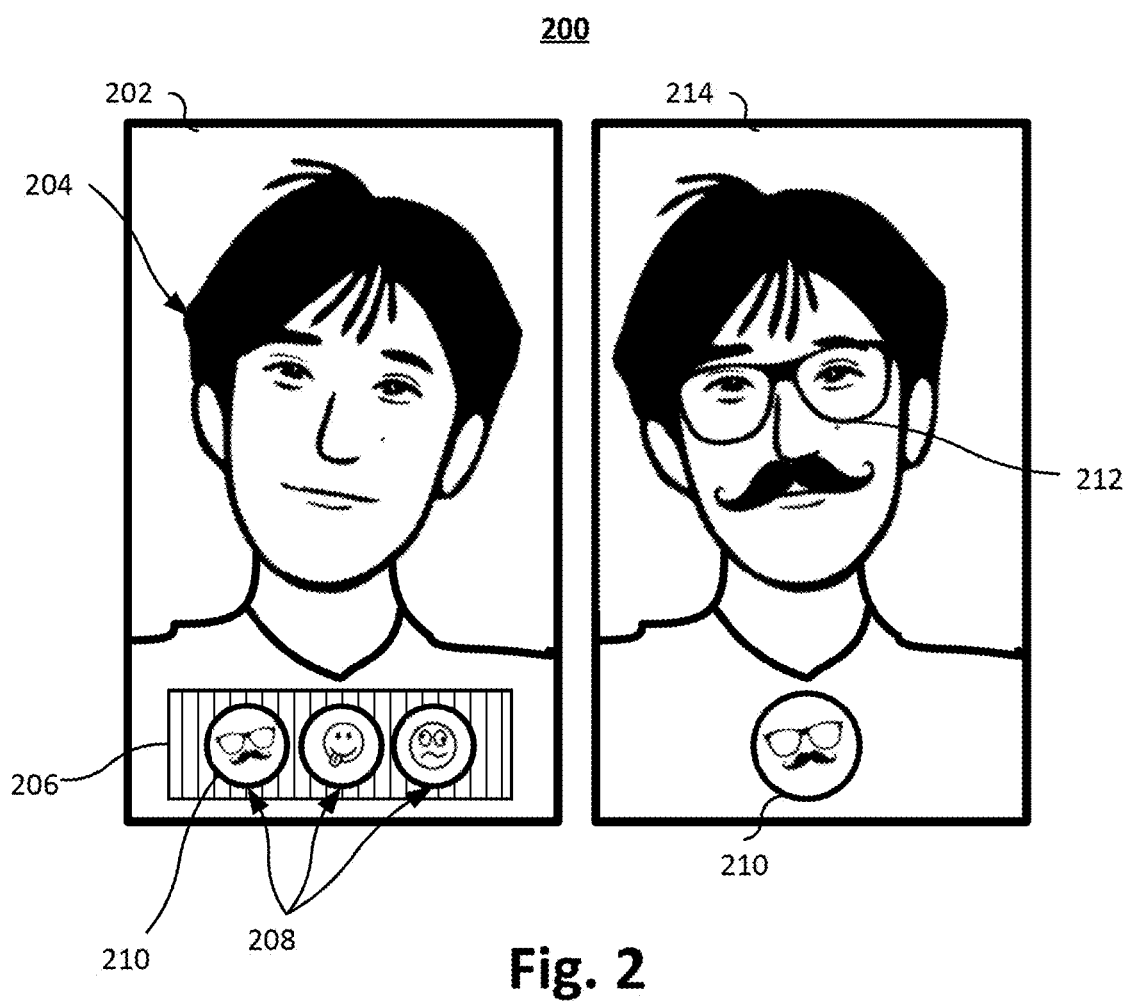
FIG. 2 is a diagram depicting screens of an AR application as a user accesses a decentralized digital asset, in accordance with exemplary aspects of the present disclosure.

FIG. 2 is a diagram 200 depicting a display include two screens 202 and 214 of an AR application that change over time as a user accesses a decentralized digital asset, in accordance with exemplary operational aspects of the present disclosure.

Screen 202 represents a screenshot of the AR application (e.g., content creation platform 118) that is accessed by user 116. Suppose that a selfie-view 204 of user 116 is being captured in screen 202. Wallet 206 may be presented on the graphical user interface of the AR application. Wallet 206 includes various AR effects 208 that user 116 owns. One of the AR effects is AR effect 210, which corresponds to decentralized digital asset 113 and is generated using package 106. When user 116 selects AR effect 210, e.g., in screen 202, then AR object 212 (e.g., a glasses and facial hair overlay) is generated on subsequent screen 214.

Figure 3:
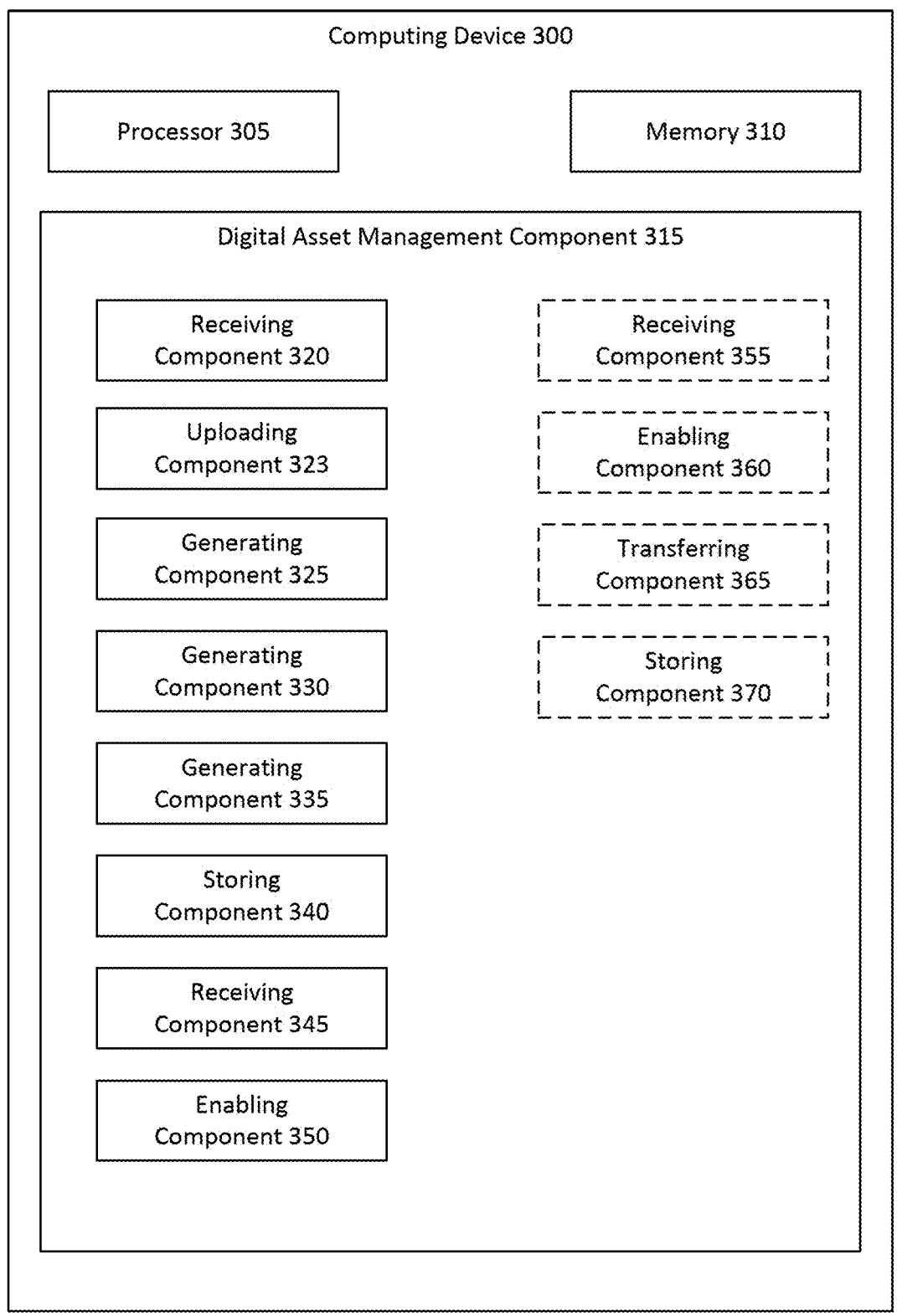
FIG. 3 is a block diagram of a computing device executing a digital asset management component, in accordance with exemplary aspects of the present disclosure.
Figure 4:
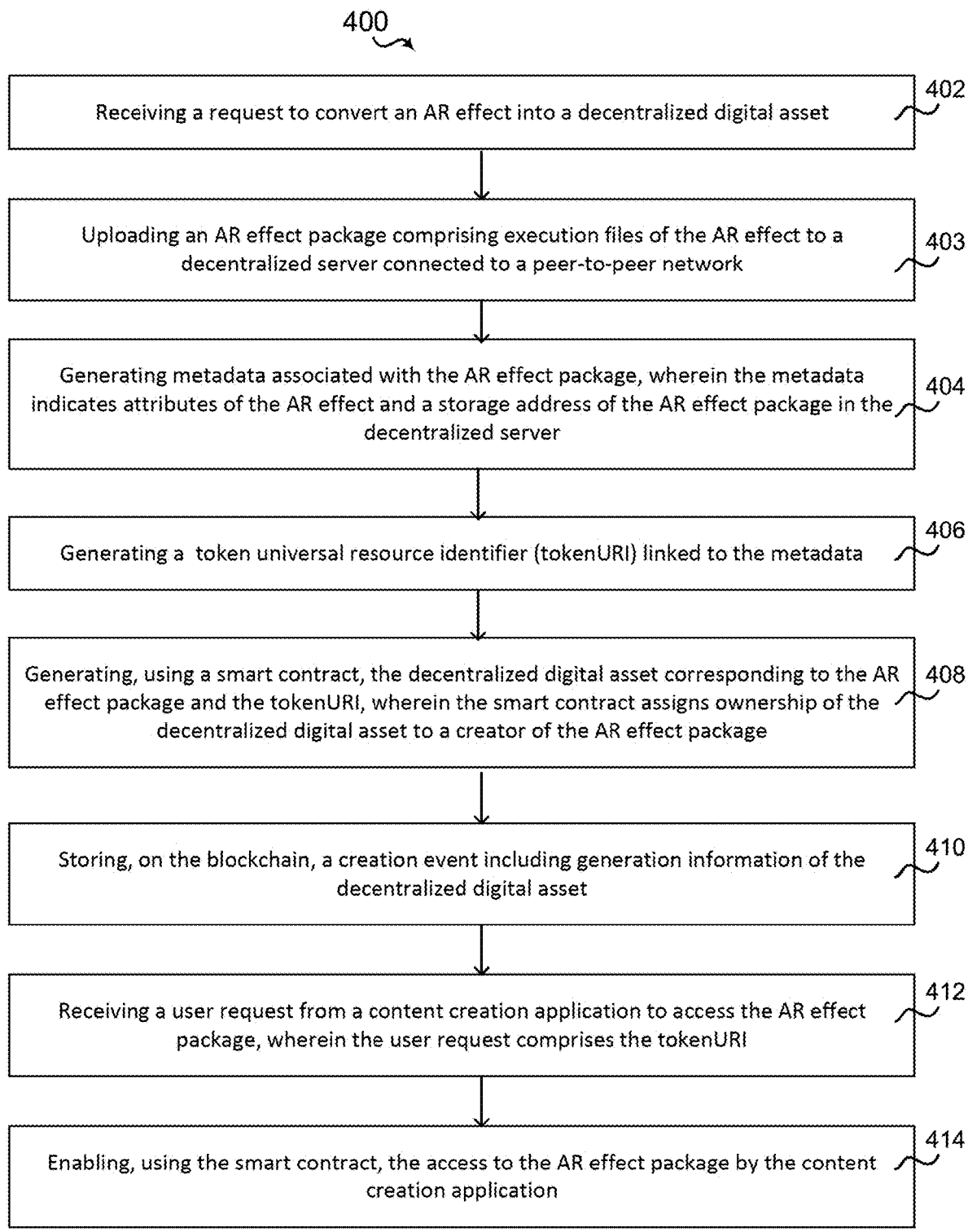
FIG. 4 is a flowchart illustrating a method of managing AR effects on a blockchain, in accordance with exemplary aspects of the present disclosure.

Referring to FIG. 3 and FIG. 4, in operation, computing device 300 may perform a method 400 of managing augmented reality (AR) effects on a blockchain, by such as via execution of digital asset management component 315 by processor 305 and/or memory 310.

At block 402, the method 400 includes receiving a request to convert an AR effect into a decentralized digital asset. For example, in an aspect, computing device 300, processor 305, memory 310, digital asset management component 315, and/or receiving component 320 may be configured to or may comprise means for receiving a request to convert AR effect 105 into decentralized digital asset 113.

For example, effect creator 102 may utilize creation tool 104 to create AR effect 105, which is an AR effect that overlays eyeglasses and a mustache on the face of a user in a content creation application. Creation tool 104 may include a button on its graphical user interface that, when selected, generates a request to convert a created AR effect into a decentralized digital asset.

At block 403, the method 400 includes uploading an AR effect package comprising execution files of the AR effect to a decentralized server connected to a peer-to-peer network. For example, in an aspect, computing device 300, processor 305, memory 310, digital asset management component 315, and/or uploading component 323 may be configured to or may comprise means for uploading AR effect package 106 comprising execution files of AR effect 105 to decentralized server 110 connected to a peer-to-peer network (e.g., part of IPFS).

For example, in response to receiving a selection of the button on creation tool 104 that converts AR effects to decentralized digital assets, creation tool 104 may upload package 106 (e.g., a zip folder) that includes any relevant data needed to render and use AR effect 105. In some aspects, creation tool 104 may upload the data to multiple servers (including server 110) that are part of the peer-to-peer network.

At block 404, the method 400 includes generating metadata associated with the AR effect package, wherein the metadata indicates attributes of the AR effect and a storage address of the AR effect package in the decentralized server. For example, in an aspect, computing device 300, processor 305, memory 310, digital asset management component 315, and/or generating component 325 may be configured to or may comprise means for generating metadata 108 associated with AR effect package 106, wherein metadata 108 indicates attributes of AR effect 105 and a storage address of AR effect package 106 in decentralized server 110.

For example, generating component 325 may generate metadata 108, which may be a data structure that includes the following information about AR effect package 106: date of creation of AR effect 105, user identifier(s) of a creator and/or owner of package 106 (e.g., a wallet address of effect creator 102, an IP/MAC address of the computing device on which creation tool 104 is installed, a name, a location, an email address, a username, a password, a phone number, etc.), visual details of AR effect 105 (e.g., size, color, position, functionality, etc., of objects in the AR effect such as the glasses and mustache), file names and sizes (e.g., of scripts or executable files), etc.

At block 406, the method 400 includes generating a token universal resource identifier (tokenURI) linked to the metadata. For example, in an aspect, computing device 300, processor 305, memory 310, digital asset management component 315, and/or generating component 330 may be configured to or may comprise means for generating tokenURI 111 linked to metadata 108.

For example, generating component 350 may be a part of creation tool 104 and may store metadata 108 into tokenURI 111. TokenURI 111 works as a pointer that points to metadata 108 stored in server 110.

At block 408, the method 400 includes generating, using a smart contract, the decentralized digital asset corresponding to the AR effect package and the tokenURI, wherein the smart contract assigns ownership of the decentralized digital asset to a creator of the AR effect package. For example, in an aspect, computing device 300, processor 305, memory 310, digital asset management component 315, and/or generating component 335 may be configured to or may comprise means for generating, using smart contract 112, decentralized digital asset 113 corresponding to AR effect package 106 and tokenURI 111, wherein smart contract 112 assigns ownership of decentralized digital asset 113 to effect creator 102 of AR effect 105.

Generating component 335 may be a function or module of smart contract 112 and is triggered in response to receiving a request to generate decentralized digital asset 113 from creation tool 104. For example, generating component 335 may execute a creation event for decentralized digital asset 113. An event may be a transaction that includes data such as from, to, nonce, cost (e.g., "gas" if blockchain 114 is an Ethereum™ blockchain), and data. The "from" field includes a public key of effect creator 102 (retrieved from the wallet of effect creator 102), the "to" field includes an address of smart contract 112 on blockchain 114, the "nonce" field represents a "number only used once," that prevents the same event from being replayed, the "cost" field represents a fee required to successfully execute an event or execute a contract on blockchain 114, and the "data" field includes the computation to be performed (e.g., executing a decentralized digital asset creation function of smart contract 112). The creation function is signed off using a private key of effect creator 102, wherein the private key is retrieved from the wallet of effect creator 102. When executing the creation event, smart contract 112 generates decentralized digital asset 113 and sets the owner of decentralized digital asset 113 as effect creator 102. Decentralized digital asset 113 may include the public key of effect creator 102, tokenURI 111 for AR effect package 106, the name of the IPFS entity that is used (e.g., server 110), the name of AR effect 105, the date when AR effect 105 was created, a description of AR effect 105, and some additional bookkeeping information.

In an alternative or additional aspect, assigning the ownership of decentralized digital asset 113 to effect creator 102 of AR effect package 106 comprises linking decentralized digital asset 113 to a wallet address of effect creator 102. As described above, the wallet address may be the public key used in the "from" field. Thus, the creation event automatically assigns the ownership to effect creator 102 using data in the "from" field.

At block 410, the method 400 includes storing, on the blockchain, a creation event including generation information of the decentralized digital asset. For example, in an aspect, computing device 300, processor 305, memory 310, digital asset management component 315, and/or storing component 340 may be configured to or may comprise means for storing, on blockchain 114 (e.g., on block 1), a creation event including generation information of decentralized digital asset 113. For example, storing component 340 may store details of the creation event (e.g., from, to, data, etc.) on blockchain 114.

At block 412, the method 400 includes receiving a user request from a content creation application to access the AR effect package, wherein the user request comprises the tokenURI. For example, in an aspect, computing device 300, processor 305, memory 310, digital asset management component 315, and/or receiving component 345 may be configured to or may comprise means for receiving a user request from content creation application (e.g., content creation platform 118) to access AR effect package 106, wherein the user request comprises tokenURI 111.

For example, user 116 may be using a certain social media platform. A wallet of user 116 may be connected to the social media application, enabling user 116 to use AR effects in his/her wallet (e.g., to produce videos or images as shown in FIG. 2). Content creation platform 118 may provide an interface that depicts a plurality of decentralized digital assets that are accessible using server 110. Each decentralized digital asset may be linked with a corresponding tokenURI. For example, user 116 may desire to access decentralized digital asset 113 via the interface. When selecting a thumbnail or a tag of decentralized digital asset 113, a request may be transmitted to smart contract 112 to enable access to package 106 associated with decentralized digital asset 113. In particular, the request may include tokenURI 111, which enables smart contract 112 to identify the specific decentralized digital asset requested for access.

At block 414, the method 400 includes enabling, using the smart contract, the access to the AR effect package by the content creation application. For example, in an aspect, computing device 300, processor 305, memory 310, digital asset management component 315, and/or enabling component 350 may be configured to or may comprise means for enabling, using smart contract 112, the access to AR effect package 106 by the content creation platform 118. In some aspects, user 116 may only be able to access decentralized digital asset 113 if user 116 requests to become an owner of decentralized digital asset 113 (see FIG. 6).

For example, smart contract 112 may transmit metadata 108 of package 106 to content creation platform 118, wherein metadata 108 includes a storage address of package 106. Content creation platform 118 may retrieve and execute package 106 to render AR effect 105.

More specifically, in an alternative or additional aspect, content creation platform 118 is configured to download AR effect package 106 from decentralized server 110 to a computing device executing content creation platform 118, decode AR effect package 106 to render AR effect 105, and enable access to AR effect 105 by user 116.

Figure 5:
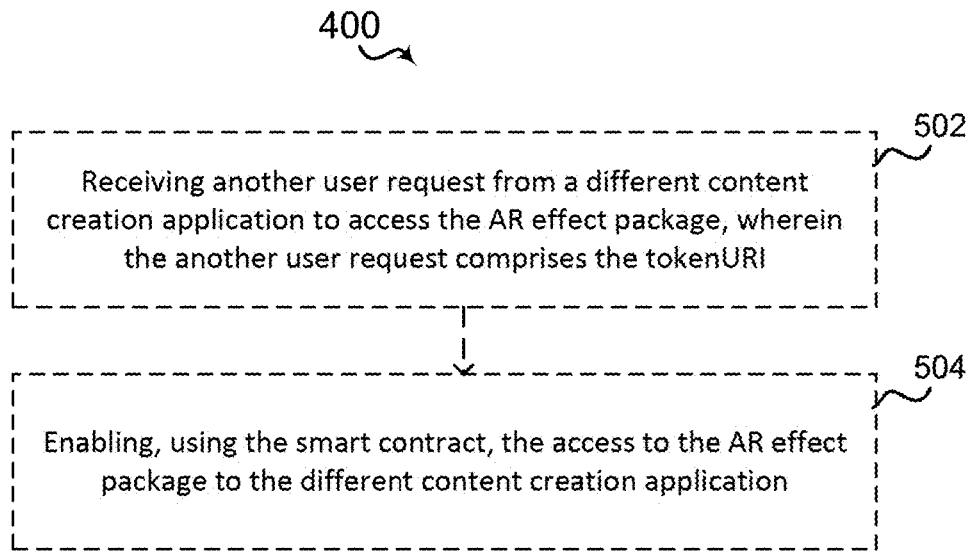
FIG. 5 is a flowchart illustrating a method of enabling access for a decentralized digital asset to a different content creation application, in accordance with exemplary aspects of the present disclosure.

Referring to FIG. 5, in an optional aspect, at block 502, the method 400 may further include receiving another user request from a different content creation application to access the AR effect package, wherein the another user request comprises the tokenURI. For example, in an aspect, computing device 300, processor 305, memory 310, digital asset management component 315, and/or receiving component 355 may be configured to or may comprise means for receiving another user request from a different content creation application (e.g., content creation platform 122) to access AR effect package 106, wherein the another user request comprises tokenURI 111.

For example, user 120 may link his/her wallet to a particular social media application. The social media application may also provide an interface depicting a plurality of decentralized digital assets accessible via server 110. User 120 may select decentralized digital asset 113.

In this optional aspect, at block 504, the method 400 may further include enabling, using the smart contract, the access to the AR effect package to the different content creation application. For example, in an aspect, computing device 300, processor 305, memory 310, digital asset management component 315, and/or enabling component 360 may be configured to or may comprise means for enabling, using smart contract 112, the access to AR effect package 106 to the different content creation application (e.g., content creation platform 122).

For example, smart contract 112 may enable user 120 of the social media application to render AR effect 105 for content creation use. The benefit of the present disclosure shown here is that decentralized digital asset 113 enables access to AR effect 105 for multiple content creation platforms. In each case, the owner of decentralized digital asset 113 remains effect creator 102.

Figure 6:
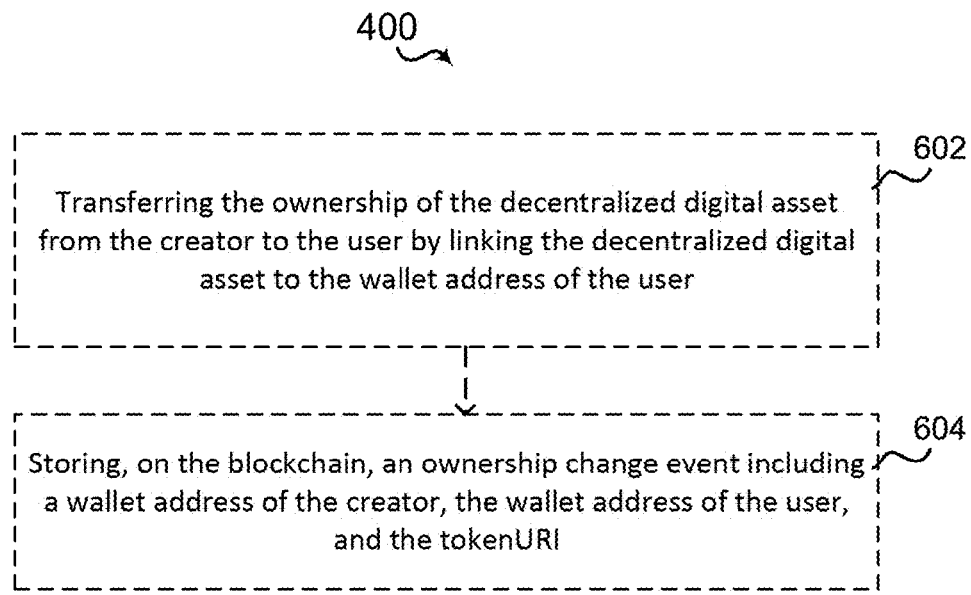
FIG. 6 is a flowchart illustrating a method of transferring ownership of a decentralized digital asset, in accordance with exemplary aspects of the present disclosure.

Referring to FIG. 6, in an optional aspect wherein the user request further comprises a wallet address of user 116 of the content creation application (e.g., content creation platform 118), at block 602, the enabling at block 414 of the access to the AR effect package to the content creation application may further include transferring the ownership of the decentralized digital asset from the creator to the user by linking the decentralized digital asset to the wallet address of the user. For example, in an aspect, computing device 300, processor 305, memory 310, digital asset management component 315, and/or transferring component 365 may be configured to or may comprise means for transferring the ownership of decentralized digital asset 113 from effect creator 102 to user 116 by linking decentralized digital asset 113 to the wallet address of user 116.

For example, the user request may specifically ask to purchase or receive ownership of decentralized digital asset 113. This request represents the creation of an ownership change event. The ownership change event may include the same fields as described above (e.g., from, to, cost, data, etc.). More specifically, the "data" field may call for a function of smart contract 112 that transfers ownership (e.g., transferring component 365) to be triggered. Effect creator 102 and/or user 116 may each sign the ownership change event using their respective private keys.

In this optional aspect, at block 604, the method 400 may further include storing, on the blockchain, an ownership change event including a wallet address of the creator, the wallet address of the user, and the tokenURI. For example, in an aspect, computing device 300, processor 305, memory 310, digital asset management component 315, and/or storing component 370 may be configured to or may comprise means for storing, on blockchain 114 (e.g., on block 2), an ownership change event including a wallet address of effect creator 102, the wallet address of user 116, and tokenURI 111. The publishing on the ownership change event on blockchain 114 signifies that user 116 is the new owner of decentralized digital asset 113.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for managing augmented reality (AR) effects on a blockchain, comprising:
   receiving a request to convert an AR effect into a decentralized digital asset;
   uploading an AR effect package comprising execution files of the AR effect to a decentralized server connected to a peer-to-peer network;
   generating metadata associated with the AR effect package, wherein the metadata indicates attributes of the AR effect and a storage address of the AR effect package in the decentralized server;
   generating a token universal resource identifier (tokenURI) linked to the metadata;

generating, using a smart contract, the decentralized digital asset corresponding to the AR effect package and the tokenURI, wherein the smart contract assigns ownership of the decentralized digital asset to a creator of the AR effect package;

storing, on the blockchain, a creation event including generation information of the decentralized digital asset;

receiving a user request from a content creation application to access the AR effect package, wherein the user request comprises the tokenURI;

enabling, using the smart contract, the access to the AR effect package by the content creation application;

receiving another user request from a different content creation application to access the AR effect package, wherein the another user request comprises the tokenURI; and enabling, using the smart contract, the access to the AR effect package to the different content creation application.

2. The method of claim 1, wherein assigning the ownership of the decentralized digital asset to the creator of the AR effect package comprises linking the decentralized digital asset to a wallet address of the creator.

3. The method of claim 1, wherein the user request further comprises a wallet address of a user of the content creation application, and wherein enabling the access to the AR effect package to the content creation application comprises:

transferring the ownership of the decentralized digital asset from the creator to the user by linking the decentralized digital asset to the wallet address of the user.

4. The method of claim 3, further comprising:

storing, on the blockchain, an ownership change event including a wallet address of the creator, the wallet address of the user, and the tokenURI.

5. The method of claim 1, wherein the content creation application is configured to:

download the AR effect package from the decentralized server to a computing device executing the content creation application;

decode the AR effect package to render the AR effect; and enable access to the AR effect by a user of the content creation application.

6. The method of claim 1, wherein the AR effect package is a folder that includes one or more of visuals, scripts, and configuration files of the AR effect.

7. An apparatus for managing augmented reality (AR) effects on a blockchain, comprising:

a memory; and a processor communicatively coupled with the memory and configured to:

receive a request to convert an AR effect into a decentralized digital asset;

upload an AR effect package comprising execution files of the AR effect to a decentralized server connected to a peer-to-peer network;

generate metadata associated with the AR effect package, wherein the metadata indicates attributes of the AR effect and a storage address of the AR effect package in the decentralized server;

generate a token universal resource identifier (tokenURI) linked to the metadata;

generate, using a smart contract, the decentralized digital asset corresponding to the AR effect package and the tokenURI, wherein the smart contract assigns ownership of the decentralized digital asset to a creator of the AR effect package;

store, on the blockchain, a creation event including generation information of the decentralized digital asset;

receive a user request from a content creation application to access the AR effect package, wherein the user request comprises the tokenURI;

enable, using the smart contract, the access to the AR effect package by the content creation application;

receive another user request from a different content creation application to access the AR effect package, wherein the another user request comprises the tokenURI; and enable, using the smart contract, the access to the AR effect package to the different content creation application.

8. The apparatus of claim 7, wherein to assign the ownership of the decentralized digital asset to the creator of the AR effect package comprises to link the decentralized digital asset to a wallet address of the creator.

9. The apparatus of claim 7, wherein the user request further comprises a wallet address of a user of the content creation application, and wherein to enable the access to the AR effect package to the content creation application comprises to:

transfer the ownership of the decentralized digital asset from the creator to the user by linking the decentralized digital asset to the wallet address of the user.

10. The apparatus of claim 9, wherein the processor is further configured to:

store, on the blockchain, an ownership change event including a wallet address of the creator, the wallet address of the user, and the tokenURI.

11. The apparatus of claim 7, wherein the content creation application is configured to:

download the AR effect package from the decentralized server to a compute device executing the content creation application;

decode the AR effect package to render the AR effect; and enable access to the AR effect by a user of the content creation application.

12. The apparatus of claim 7, wherein the AR effect package is a folder that includes one or more of visuals, scripts, and configuration files of the AR effect.

13. A non-transitory computer-readable medium having instructions stored thereon for managing augmented reality (AR) effects on a blockchain, wherein the instructions are executable by a processor to:

receive a request to convert an AR effect into a decentralized digital asset;

upload an AR effect package comprising execution files of the AR effect to a decentralized server connected to a peer-to-peer network;

generate metadata associated with the AR effect package, wherein the metadata indicates attributes of the AR effect and a storage address of the AR effect package in the decentralized server;

generate a token universal resource identifier (tokenURI) linked to the metadata;

generate, using a smart contract, the decentralized digital asset corresponding to the AR effect package and the tokenURI, wherein the smart contract assigns ownership of the decentralized digital asset to a creator of the AR effect package;

store, on the blockchain, a creation event including generation information of the decentralized digital asset;

receive a user request from a content creation application to access the AR effect package, wherein the user request comprises the tokenURI;

enable, using the smart contract, the access to the AR effect package by the content creation application;

receive another user request from a different content creation application to access the AR effect package, wherein the another user request comprises the tokenURI; and enable, using the smart contract, the access to the AR effect package to the different content creation application.

14. The non-transitory computer-readable medium of claim 13, wherein to assign the ownership of the decentralized digital asset to the creator of the AR effect package comprises to link the decentralized digital asset to a wallet address of the creator.

15. The non-transitory computer-readable medium of claim 13, wherein the user request further comprises a wallet address of a user of the content creation application, and wherein to enable the access to the AR effect package to the content creation application comprises to:

transfer the ownership of the decentralized digital asset from the creator to the user by linking the decentralized digital asset to the wallet address of the user.

16. The non-transitory computer-readable medium of claim 15, further comprising instructions executable by the processor to:

store, on the blockchain, an ownership change event including a wallet address of the creator, the wallet address of the user, and the tokenURI.

17. The non-transitory computer-readable medium of claim 13, further comprising instructions executable by the processor to:

download the AR effect package from the decentralized server to a compute device executing the content creation application;

decode the AR effect package to render the AR effect; and enable access to the AR effect by a user of the content creation application.

\* \* \* \* \*